(12) United States Patent
Allan et al.

(10) Patent No.: US 12,712,401 B2
(45) Date of Patent: Aug. 18, 2026

(54) SYSTEMS AND METHODS FOR DETECTING WIRELESS CHARGER COUPLING

(71) Applicant: Apple Inc., Cupertino, CA (US)

(72) Inventors: William R. Allan, Boulder Creek, CA (US); Guangwu Duan, Cupertino, CA (US); Jian Guo, Palo Alto, CA (US); Chaitanya Mudivarthi, Sunnyvale, CA (US); Long T. Pham, San Jose, CA (US)

(73) Assignee: Apple Inc., Cupertino, CA (US)

( * ) Notice: Subject to any disclaimer, the term of this patent is extended or adjusted under 35 U.S.C. 154(b) by 865 days.

(21) Appl. No.: 17/950,801

(22) Filed: Sep. 22, 2022

(65) Prior Publication Data

US 2023/0095729 A1 Mar. 30, 2023

Related U.S. Application Data

(60) Provisional application No. 63/247,939, filed on Sep. 24, 2021.

(51) Int. Cl.
*H02J 50/90* (2016.01)
*H02J 50/10* (2016.01)

(52) U.S. Cl.
CPC .............. *H02J 50/90* (2016.02); *H02J 50/10* (2016.02)

(58) Field of Classification Search
CPC ...................................................... H02J 50/90
USPC .......................................................... 320/108
See application file for complete search history.

(56) References Cited

U.S. PATENT DOCUMENTS

| | | | | |
|---|---|---|---|---|
| 8,901,881 | B2 * | 12/2014 | Partovi | H02J 50/80 320/108 |
| 10,072,947 | B1 * | 9/2018 | Mantler | G01B 7/31 |
| 10,459,677 | B2 * | 10/2019 | Patel | H02J 50/90 |
| 2020/0259375 | A1 * | 8/2020 | Hemphill | B60L 53/38 |
| 2021/0083518 | A1 * | 3/2021 | Stingu | G01R 33/0094 |
| 2022/0352765 | A1 * | 11/2022 | Cook | H02J 50/10 |

* cited by examiner

*Primary Examiner* — Ahmed H Omar
(74) *Attorney, Agent, or Firm* — BakerHostetler

(57) ABSTRACT

Circuitry in the electronic device may use a plurality of magnetic sensors to detect an alternating current signal transmitted by the wireless charger and/or to detect a magnetic field generated by one or more magnets in the wireless charger. The circuitry may determine a position of the wireless charger relative to a wireless power transfer coil in the electronic device and provide feedback to guide users in attaching the wireless charger to the correct position on the electronic device, including such as visual indications on a device display.

22 Claims, 5 Drawing Sheets

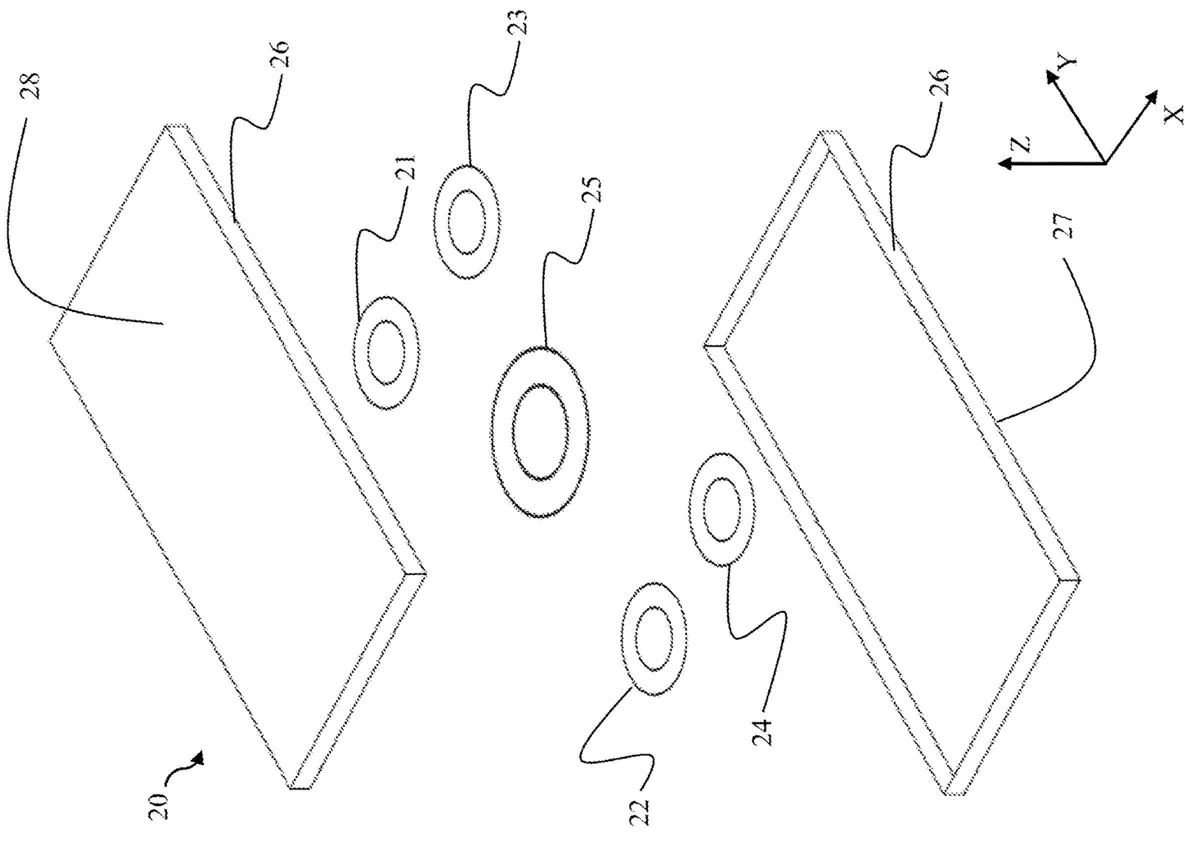
FIG. 1
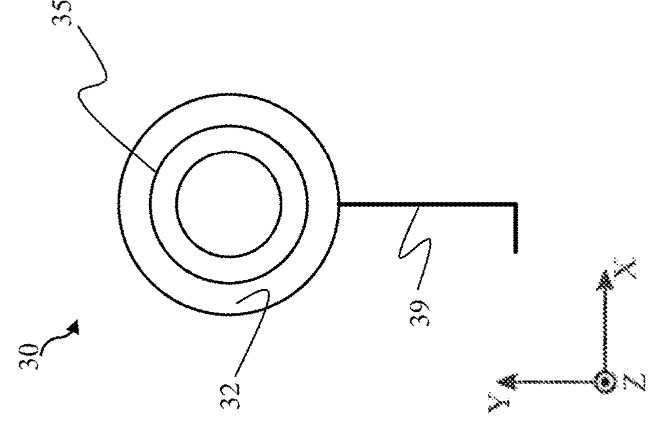

SYSTEMS AND METHODS FOR DETECTING WIRELESS CHARGER COUPLING

CROSS-REFERENCE TO RELATED PATENT APPLICATION

This patent application claims the benefit under 35 U.S.C. § 119(e) of U.S. Patent Application No. 63/247,939 filed Sep. 24, 2021, entitled "Systems and Methods for Detecting Wireless Charge Coupling" which is incorporated herein by reference in its entirety.

TECHNICAL FIELD

This disclosure relates generally to wirelessly charging electronic devices.

BACKGROUND

Portable electronic devices such as cellular telephones, tablet computers, laptop computers, and other portable devices use batteries. To enhance convenience for users, wireless power systems have been provided that allow batteries in portable electronic devices to be charged using wireless power. Coils in wireless power transmitting and receiving devices may be used to transmit and receive wireless power signals. The electromagnetic coupling between the transmitting and receiving coils may affect the wireless charging efficiency and the power produced in the receiving device. The physical alignment of the transmitting and receiving coils in the X, Y, and Z dimensions affects the electromagnetic coupling.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Coils in wireless power transmitting and receiving devices may be used to transmit and receive wireless power signals. The electromagnetic coupling between the transmitting and receiving coils may affect the wireless charging efficiency and the power produced in the receiving device. When users attach a wireless charger to an electronic device, there is a possibility that the charger may be attracted by other magnets inside the device (e.g., speakers, haptic module) resulting in low coupling between the transmitting coil of the charger and receiving coil of the electronic devices. This may cause lower charging efficiency or other sub-optimal user experience. Disclosed herein are apparatuses, methods and systems to detect the position of a wireless charger relative to a wireless power transfer coil in the electronic device. This may enable the electronic device to provide feedback to guide users in attaching the charger to the correct position on the device.

An exemplary embodiment includes an electronic device configured to receive wireless power from a wireless power transmitting device. The electronic device includes a wireless power transfer coil, a plurality of magnetic sensors, a display, and control circuitry. The electronic device control circuitry is configured to detect, using the plurality of magnetic sensors, an alternating current signal transmitted by the wireless power transmitting device and to determine a position of the wireless power transmitting device relative to the wireless power transfer coil. In addition, the control circuitry is configured to present, using the display, a visual indication of the position of the wireless power transmitting device relative to the wireless power transfer coil.

Another exemplary embodiment includes an electronic device configured to receive wireless power from a wireless power transmitting device. The wireless power transmitting device includes one or more magnets. The electronic device includes a wireless power transfer coil, a plurality of magnetic sensors, a display, and control circuitry. The electronic device control circuitry is configured to detect, using the plurality of magnetic sensors, a magnetic field generated by the one or more magnets in the wireless power transmitting device and determine a position of the wireless power transmitting device relative to the wireless power transfer coil. In addition, the control circuitry is configured to present, using the display, a visual indication of the position of the wireless power transmitting device relative to the wireless power transfer coil.

This Summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description, are better understood when read in conjunction with the appended drawings. In the drawing, for purposes of explanation, numerous specific details are set forth in order to provide an understanding of the variations in implementing the disclosed technology. However, the instant disclosure may take many different forms and should not be construed as limited to the specific examples disclosed in the drawings. When practical, like numbers refer to like elements throughout. In the drawings:

FIG. 1 illustrates an exemplary wireless power transfer system that includes a wireless power transmitting device and a wireless power receiving device, in accordance with illustrative embodiments of the disclosure;

DETAILED DESCRIPTION

Figure 2:
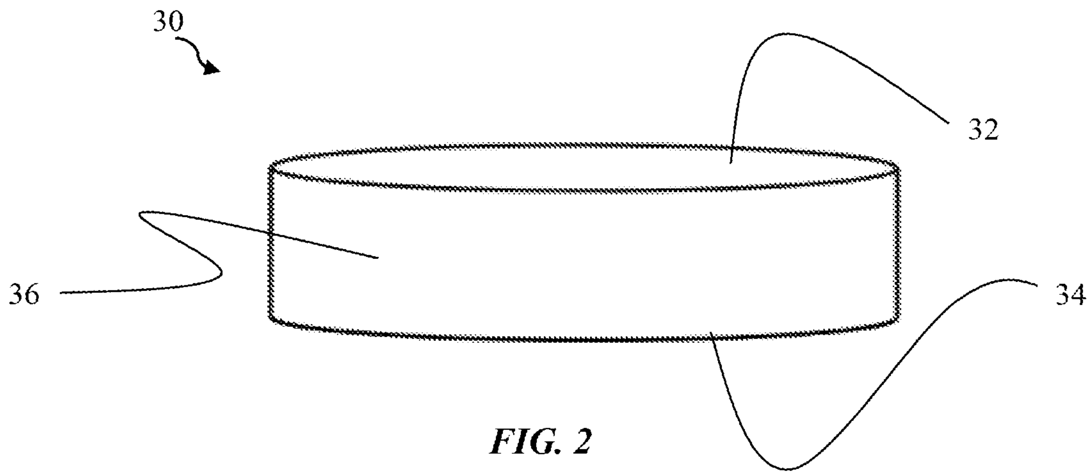
FIG. 2 is a perspective view of an exemplary wireless power transmitting device illustrated in FIG. 1, in accordance with illustrative embodiments of the disclosure.

FIG. 1 illustrates an exemplary wireless power transfer system 10 that includes a wireless power transmitting device 30 (i.e., wireless charger) that transfers power to a wireless power receiving device 20 (i.e., wireless power receiver). Examples of wireless power receiving device 20 include electronic devices such as cellular telephones, tablet computers, laptop computers, or other electronic equipment. The wireless power transmitting device 30 may be a wireless charging puck or mat that has a wireless power transfer coil 35 and a charging surface 32 that receives portable electronic devices to be charged. Exemplary wireless power receiving device 20 has a housing 26 that includes a front surface 28 that may be substantially defined by a display screen (not illustrated), and a rear surface 27, that may be placed one or over a charging surface 32 of wireless charger 30. Exemplary wireless power receiving device 20 includes one or more wireless power transfer coils 25 on or within housing 26. Exemplary wireless power receiving device 20 includes a plurality of magnetic sensors 21, 22, 23, 24. The wireless power receiving devices use power from the wireless power transmitting device for powering internal components and/or for charging internal batteries.

Coils in the power transmitting and receiving devices may be used to transmit and receive wireless power signals. The physical alignment of coil 35 in device 30 and coil 25 in device 20 in the X, Y, and Z dimensions affects the electromagnetic coupling (also referred to herein as the coupling between transmitting device 30 and receiving/electronic device 20). For example, when a user attaches a wireless charger to an electronic device, there is a possibility that the charger may be attracted by other magnets inside the electronic device (e.g., speakers, haptic module) resulting in sub-optimal positioning of the charger on the device. Disclosed herein are apparatuses, methods and systems to detect and determine the position of a wireless charger relative to a wireless power transfer coil in the electronic device using magnetic sensors. This may enable the electronic device to provide feedback to guide users in attaching the charger to optimal positions on the electronic device. In some embodiments, sensors of alternating current (AC) fields are used. In some embodiments, sensors of direct-current (DC) fields are used.

The wireless power receiving device 20 and wireless power transmitting device 30 each include control circuitry. The control circuitry may include processing circuitry associated with microprocessors, power management units, baseband processors, digital signal processors, microcontrollers, and/or application-specific integrated circuits with processing circuits. The processing circuitry implements desired control and communications features in the electronic device 20 and power transmitting device 30. For example, the processing circuitry may be used in processing sensor data and other data, making measurements, and presenting information as discussed herein, along with selecting coils, adjusting the phases and magnitudes of coil drive signals, determining power transmission levels, processing user input, handling negotiations between devices 20 and 30, sending and receiving data, starting and stopping charging operations, and otherwise controlling the operation of system 10.

Control circuitry in in devices 20 and 30 may be configured to perform operations using hardware (e.g., dedicated hardware or circuitry), firmware and/or software. Software code for performing operations may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of devices 20 and 30. The processing circuitry may include application-specific integrated circuits with processing circuitry, one or more microprocessors, a central processing unit (CPU) or other processing circuitry.

Electronic device 20 includes a housing such as housing 26. Housing 26 has a surface 27, also referred to herein as rear surface 27, that is placed on or over a charging surface of device 30 for wirelessly charging device 20. For example, both rear surface 27 and the charging surface 32 of device 30 may lie substantially parallel to the X-Y plane during wireless charging. Housing 26 has a front surface 28 that is substantially defined by a display screen, such as a OLED or LCD display, the front surface 28 is opposite the rear surface 27.

Electronic device 20 includes one or more wireless power transfer coils 25 on or within housing 26. Housing 26 may include metal materials, dielectric materials, or combinations of these and/or other materials. In scenarios where coil(s) 25 is mounted within housing 26, housing 26 may include dielectric portions in the vicinity of the coils to allow external magnetic fields to interact with coil(s) 25.

The electronic device 20 also includes a plurality of magnetic sensors 21, 22, 23, 24. The exemplary embodiment illustrated in FIG. 1 includes four magnetic sensors; however, the invention may have more or fewer magnetic sensors. The magnetic sensors may be a coil or other magnetic sensor such as a tunnel-magnetoresistance (TMR) sensor, a giant-magnetoresistance (GMR) sensor, or a Hall effect sensor, or any combination thereof. In an embodiment of the present disclosure, the plurality of magnetic sensors may include the wireless power transfer coil 25.

As explained in detail below, control circuitry in electronic device 20 may use the plurality of magnetic sensors to detect an alternating current signal transmitted by the wireless power transmitting device 30 and/or detect a magnetic field generated by one or more magnets in the wireless power transmitting device. In addition, control circuitry in electronic device 20 may determine a position of the wireless power transmitting device 30 relative to the wireless power transfer coil 25 and provide feedback to guide users in attaching device 30 to the correct position on device 20. For example, control circuitry in electronic device 20 may present visual indications of the position of device 30 relative to coil 25 using the electronic device display 29.

Figure 3:
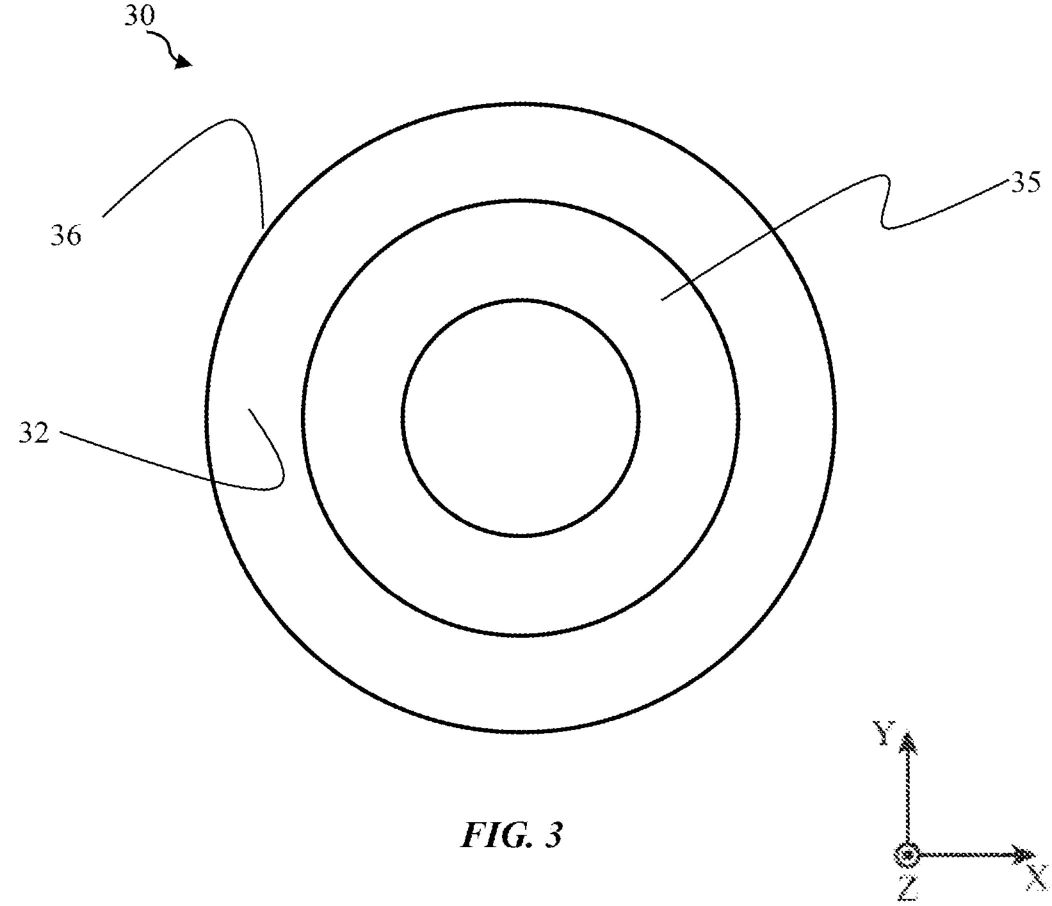
FIG. 3 is a top-down view of the wireless power transmitting device shown in FIG. 2, in accordance with illustrative embodiments of the disclosure.

FIG. 2 is a perspective view and FIG. 3 is a top-down view of wireless power transmitting device 30 in an illustrative configuration. Power transmitting device 30 may be a stand-alone power adapter (e.g., a wireless charging puck or mat that includes power adapter circuitry), may be a wireless charging puck or mat that is coupled to a power adapter or other equipment by a cable, or may be other wireless power transfer equipment. Power transmitting device 30 may be coupled to a wall outlet (e.g., an alternating current power source), may have a battery for supplying power, and/or may have another source of power. Power transmitting device 30 may have an alternating-current (AC) to direct-current (DC) power converter such as AC-DC power converter for converting AC power from a wall outlet or other power source into DC power. Illustrative configurations in which wireless power transmitting device 30 is a wireless charging puck are described herein as an example.

FIGS. 2 and 3 illustrate the exemplary configuration of wireless power transmitting device 30 as a wireless charging puck that includes a housing 36, a charging surface 32 and a planar surface 34 that opposes charging surface 32 and that rests on an underlying surface such as a tabletop or other surface. Device 30 may have a wireless power transfer coil 35 at charging surface 32 for transferring wireless power to coil 25 in power receiving device 20. A user may place device 20 onto charging surface 32 for charging device 20. Rear surface 27 of device 20 (FIG. 1) and charging surface 32 lie within planes that are substantially parallel to the X-Y plane of FIG. 3 during wireless charging. As shown, the exemplary housing 36 is in the form of a cylindrical puck and the charging surface 32 and planar surface 34 have the geometric shape of a circle. Housing 36, charging surface 32 and planar service 34 may be configured to have various geometric shapes without departing from the scope and spirit of the invention as described herein.

Embodiments of wireless power transmitting device 30 also include one or more magnets (not shown) such as permanent magnets. The one or more magnets may generate a particular magnetic field pattern. In some examples, the one or more magnets are arranged circumferentially around the wireless power transfer coil 35.

Device 30 may drive wireless power transfer coil 35 using a corresponding inverter to produce a magnetic field. The magnetic field passes through coil 25 while device 20 is placed on charging surface 32 and induces current on coil 25 that serves to wirelessly charge device 20. Electromagnetic coupling between coil 35 and coil 25 is optimized when coil 25 is centered about coil 35.

Control circuitry in device 30 may include power transmitting circuitry to transmit wireless power to power receiving circuitry of device 20. The device 30 power transmitting circuitry may have switching circuitry (e.g., inverter circuitry formed from transistors) that is turned on and off based on control signals provided by control circuitry to create AC current signals through one or more transmit coils 35. During wireless power transmission operations, the device 30 power transmitting circuitry may supply AC drive signals to one or more coils 35 at a given power transmission frequency. The power transmission frequency may be, for example, a predetermined frequency of about 125 kHz, at least 80 kHz, at least 100 kHz, less than 500 kHz, less than 300 kHz, less than 150 KHz, between 80 kHz and 150 kHz, or other suitable wireless power frequency. In some configurations, the power transmission frequency may be negotiated in communications between devices 20 and 30. In other configurations, the power transmission frequency may be fixed.

As the AC currents pass through one or more coils 35, a time varying electromagnetic (e.g., magnetic) field (signals) is produced that is received by one or more corresponding receiver coils such as coil 25 in power receiving device 20. When the time varying electromagnetic field is received by coil 25, corresponding alternating-current currents are induced in coil 25. Rectifier circuitry in device 20, which contains rectifying components such as synchronous rectification metal-oxide-semiconductor transistors arranged in a bridge network, converts received AC signals from coil 25 into DC voltage signals for powering device 20. The DC voltages produced by the rectifier circuitry may be used in powering (charging) an energy storage device such as battery and may be used in powering other components in device 20.

As noted above, the physical alignment of coil 35 in device 30 and coil 25 in device 20 in the X, Y, and Z dimensions affects the electromagnetic coupling between transmitting device 30 and electronic device 20. A first embodiment to assist users in attaching the wireless power transmitting device 30 to the correct position on electronic device 20 may be characterized as alternating current (AC) field detection. In an exemplary AC field detection embodiment, the coil 35 in wireless power transmitting device 30 generates and transmits an alternating current (AC) magnetic field signal (e.g., a "ping"). The transmitted alternating current signal may be a low-power signal relative to the AC signals produced and transmitted during the power delivery operations. The wireless power transmitting device 30 may transmit the alternating current signal at a repeating interval. For example, device 30 may transmit the AC signal every 0.1 second. Alternatively, device 30 may transmit the AC signal at an interval greater than 0.1 seconds or less than 0.1 seconds. In addition, the alternating current signal may have a pattern that may enable control circuitry in electronic device 20 to identify the alternating current signal pattern relates to a particular type of wireless power transmitting device 30.

Continuing the AC field detection embodiment with reference to FIG. 1, the alternating current signal transmitted by device 30 may induce alternating current voltage in the plurality of magnetic sensors 21, 22, 23, 24 in electronic device 20. The magnetic sensors may be a coil or other magnetic sensor such as a tunnel-magnetoresistance (TMR) sensor, a giant-magnetoresistance (GMR) sensor, or a Hall effect sensor. The plurality of magnetic sensors may include the wireless power transfer coil 25.

Control circuitry in device 20 may be configured to measure a level of alternating current voltage induced in each magnetic sensor of the plurality of magnetic sensors 21, 22, 23, 24. Based on the level of induced voltage, the control circuitry in device 20 may be configured to determine a position of device 30 relative to the wireless power transfer coil 25 in electronic device 20.

In an exemplary embodiment, the control circuitry in device 20 may be configured to use the level of alternating current voltage induced in each magnetic sensor of the plurality of magnetic sensors 21, 22, 23, 24 to calculate a distance from the wireless power transmitting device 30 to each sensor. Knowing the distance from device 30 to each sensor of the plurality of magnetic sensors, the control circuitry may triangulate the position of device 30 relative to the wireless power transfer coil 25 in electronic device 20, as explained in detail below with reference to FIG. 4.

In an alternative embodiment, the control circuitry in device 20 may be configured to compare the measured level of alternating current voltage induced in each magnetic sensor of the plurality of magnetic sensors 21, 22, 23, 24 with values in a lookup table to determine the position of device 30 relative to the wireless power transfer coil 25 electronic device 20. For example, the lookup table may be created in a calibration phase where a wireless power transfer device 30 is placed in a plurality of known positions relative to the wireless power transfer coil 25 in electronic device 20. At each of the plurality of known positions, device 30 may transmit an alternating current signal that induces alternating current voltage in the plurality of magnetic sensors 21, 22, 23, 24. The level of alternating current voltage induced in each sensor may be measured and stored in the lookup table, in a manner associated with each of the plurality of known positions. The lookup table may be stored in a memory of device 20.

Optionally, the measuring and storing of induced voltage values in a lookup table for the plurality of magnetic sensors during the calibration phase may be repeated at each of the plurality of known positions with the wireless power transmitting device 30 in different orientations relative to the wireless power transfer coil 25. For example, the plurality of known positions may comprise a three-dimensional grid oriented in the X, Y, and Z axes relative to the rear surface 27 of device 20 (FIG. 1). Measurements may be made and stored for various X and Y coordinate positions with the charging surface 32 device 30 (FIG. 3) in contact with the rear surface 27 of device 20 (i.e., a zero offset in the Z axis) and the power cord 39 of device 30 extending in a first direction (e.g., the 6 o'clock direction as shown in FIG. 1). Device 30 may be rotated about the Z axis such that the power cord 39 of device 30 extends in other directions and the measurements may be repeated and stored for the various X and Y coordinate positions. Similarly, measurements may be made and stored for various offsets in the Z axis, wherein rear surface 27 and charging surface 32 are in substantially parallel planes. In addition, measurements may be made and stored for various offsets in the Z axis, wherein rear surface 27 and charging surface 32 are not in parallel planes. Accordingly, the lookup table may enable control circuitry in device 20 to determine a position and an orientation of device 30 relative to the wireless power transfer coil 25 based on the measured induced voltage values in the plurality of magnetic sensors 21, 22, 23 24.

After the calibration phase, which may occur during design of devices 20 and 30 and/or during the manufacturing process, device 20 may at run-time obtain measurements from magnetic sensors 21, 22, 23, 24 and compare those obtained values with entries in the lookup table. Device 20 may then determine the position, and optionally orientation, of device 30 by identifying the look up entry most closely matching the measured sensor values. For example, various techniques, such as distance and matrix norm functions, may be used to quantify the difference between individual entries in a lookup table (e.g., representing position and orientations), out of a plurality of entries in the lookup table, with a set of measured magnetic sensor output values. Various techniques, such as Gradient Descent, Nelder-Mead, and Differential Evolution calculations, may be used to determine the look up table entry that is closest to the set of measured magnetic sensor output values.

While reference is made to four magnetic sensors in the exemplary embodiments described above and in FIG. 1, AC field detection may be achieved with other numbers of sensors, with the use of higher numbers of sensors leading generally to higher detection fidelity, and vice versa. In embodiments involving additional mechanical constraints between transmitter and receiver, a minimum number of sensors can be used. For example, a single sensor can sense whether a slug shaped wireless power receiver is in acceptable wireless charging position within a cylindrical sleeve wireless power transmitter.

After the control circuitry in device 20 determines the position of device 30 relative to the wireless power transfer coil 25, the control circuitry may trigger a user interface to provide feedback to guide users in attaching device 30 to the correct position on the electronic device 20. As explained below with reference to FIGS. 5A-5C, the user interface may present visual indications of the position of the wireless power transmitting device 30 relative to the wireless power transfer coil 25 using the display 29 in device 20.

In AC field detection, one or more sensors of the plurality of magnetic sensors in device 20 may be configured to actively search for an alternating current signal transmitted by the wireless power transmitting device 30. Such a configuration, where a magnetic sensor is actively searching for the alternating current signal from the charger, may drain a battery in device 20. Accordingly, lower-power options for detecting the alternating current signal may be desirable. For example, the wireless power transmitting device 30 may include one or more magnets. The plurality of magnetic sensors in electronic device 20 may include a direct-current (DC) magnetometer and the control circuitry in device 20 may be configured to use the DC magnetometer to detect a change in a magnetic field. Once the control circuitry in device 20 detects the change in the magnetic field, the control circuitry may activate an alternating current (AC) sensor to actively search for the alternating current signal transmitted by the wireless power transmitting device 30.

In another example, device 20 may have a specialized circuit to detect the alternating current signal transmitted by the wireless power transmitting device 30. The specialized circuit may include a bandpass filter, rectifier, and a capacitor. The bandpass filter may be configured to allow only the frequency of the alternating current signal through which may be used to charge the capacitor via the rectifier. The control circuitry in device 20 may be configured to measure a potential across the capacitor. Once the control circuitry measures a desired charge in the capacitor, it may trigger the process discussed above to measure the level of alternating current induced in each magnetic sensor, determine the distance from device 30 to each magnetic sensor of the plurality of sensors, thereby determine the position of device 30 relative to the coil 25 device 20, and display visual indications of the position of device 30 to guide users in attaching device 30 to the correct position on the electronic device 20.

An alternative embodiment to assist users in attaching the wireless power transmitting device 30 to the correct position on electronic device 20 may be characterized as direct-current (DC) field-based detection. Referring to FIGS. 1, 2, and 3 for a first DC field detection embodiment, the wireless power transmitting device 30 may include one or more magnets. The one or more magnets in device 30 may comprise a permanent magnet. In addition the one or more magnets may be disposed circumferentially around a wireless power transfer coil 35 in device 30. The one or more magnets in device 30 may generate a magnetic field. Alternatively, the one or more magnets in device 30 may generate a particular magnetic field pattern.

Control circuitry in device 20 may be configured to detect the magnetic field generated by the one or more magnets in device 30 using the plurality of magnetic sensors 21, 22, 23, 24 in device 20. Alternatively, the control circuitry in device 20 may be configured to detect the particular magnetic field pattern generated by the one or more magnets of device 30 using the plurality of magnetic sensors 21, 22, 23, 24 in device 20. By detecting the particular magnetic field pattern, control circuitry in device 20 may be able to determine that the particular magnetic field pattern relates to a particular wireless power transmitting device 30 (i.e., a particular type of wireless charger), which may allow the control circuitry to reject any unwanted magnetic interferences from other devices. The magnetic sensors may be a coil or other magnetic sensor such as a tunnel-magnetoresistance (TMR) sensor, a giant-magnetoresistance (GMR) sensor, or a Hall effect sensor, or any combination thereof. In an embodiment of the present disclosure, the plurality of magnetic sensors may include the wireless power transfer coil 25.

Once the magnetic field or particular magnetic field pattern has been detected, control circuitry in device 20 may be configured to determine a position of the wireless power transmitting device 30 relative to the wireless power transfer coil 25 in device 20. In an exemplary embodiment, control circuitry in device 20 may measure the magnetic field using the plurality of magnetic sensors 21, 22, 23, 24 and determine a distance from device 30 to each magnetic sensor of the plurality of magnetic sensors based on the magnetic field measured in each magnetic sensor. Control circuitry in device 20 may then determine the position of the wireless power transmitting device 30 relative to the wireless power transfer coil 25 by triangulating the distance from device 30 to the plurality of magnetic sensors 21, 22, 23, 24, as explained in detail below with reference to FIG. 4.

In an alternative embodiment, the control circuitry in device 20 may be configured to measure the magnetic field using the plurality of magnetic sensors 21, 22, 23, 24 and to compare a magnetic field measurement from each magnetic sensor of the plurality of magnetic sensors with values in a lookup table to determine the position of device 30 relative to the wireless power transfer coil 25 electronic device 20. For example, the lookup table may be created in a calibration phase where a wireless power transfer device 30 is placed in a plurality of known positions relative to the wireless power transfer coil 25 in electronic device 20. At each of the plurality of known positions, the magnetic field generated by one or more magnets in device 30 may be measured using the plurality of magnetic sensors 21, 22, 23, 24. The magnetic field measurements for each magnetic sensor of the plurality of magnetic sensors may be stored in the lookup table, associated with corresponding known positions of electronic device 30 relative to electronic device 20. The lookup table may be stored in a memory of device 20.

Optionally, the measuring and storing of magnetic field measurements in a lookup table for the plurality of magnetic sensors during the calibration phase may be repeated at each of the plurality of known positions with the wireless power transmitting device 30 in different orientations relative to the wireless power transfer coil 25. For example, the plurality of known positions may comprise a three-dimensional grid oriented in the X, Y, and Z axes relative to the rear surface 27 of device 20 (FIG. 1). Measurements may be made and stored for various X and Y coordinate positions with the charging surface 32 device 30 (FIG. 3) in contact with the rear surface 27 of device 20 (i.e., a zero offset in the Z axis) and the power cord 39 of device 30 extending in a first direction (e.g., the 6 o'clock direction as shown in FIG. 1). Device 30 may be rotated about the Z axis such that the power cord 39 of device 30 extends in other directions and the measurements may be repeated and stored for the various X and Y coordinate positions. Similarly, measurements may be made and stored for various offsets in the Z axis, wherein rear surface 27 and charging surface 32 are in substantially parallel planes. In addition, measurements may be made and stored for various offsets in the Z axis, wherein rear surface 27 and charging surface 32 are not in parallel planes. Accordingly, the lookup table may enable control circuitry in device 20 to determine a position and an orientation of device 30 relative to the wireless power transfer coil 25 based on the magnetic field measurements for the plurality of magnetic sensors 21, 22, 23, 24.

After the calibration phase, which may occur during design of devices 20 and 30 and/or during the manufacturing process, device 20 may at run-time obtain measurements from magnetic sensors 21, 22, 23, 24 and compare those obtained values with entries in the lookup table. Device 20 may then determine the position, and optionally orientation, of device 30 by identifying the look up entry most closely matching the measured sensor values. For example, various techniques, such as distance and matrix norm functions, may be used to quantify the difference between individual entries in a lookup table (e.g., representing position and orientations), out of a plurality of entries in the lookup table, with a set of measured magnetic sensor output values. Various techniques, such as Gradient Descent, Nelder-Mead, and Differential Evolution calculations, may be used to determine the look up table entry that is closest to the set of measured magnetic sensor output values.

While reference is made to four sensors in the exemplary embodiments described above and in FIG. 1, DC field detection may be achieved with other numbers of sensors, with the use of higher numbers of sensors leading generally to higher detection fidelity, and vice versa. In embodiments involving additional mechanical constraints between transmitter and receiver, a minimum number of sensors can be used. For example, a single sensor can sense whether a slug shaped wireless power receiver is in acceptable wireless charging position within a cylindrical sleeve wireless power transmitter.

After the control circuitry in device 20 determines the position of device 30 relative to the wireless power transfer coil 25, the control circuitry may trigger a user interface to provide feedback to guide users in attaching device 30 to the correct position on the electronic device 20. As discussed below with reference to FIGS. 5A-5C, the user interface may present visual indications of the position of the wireless power transmitting device 30 relative to the wireless power transfer coil 25 using the display 29 in device 20.

Figure 4:
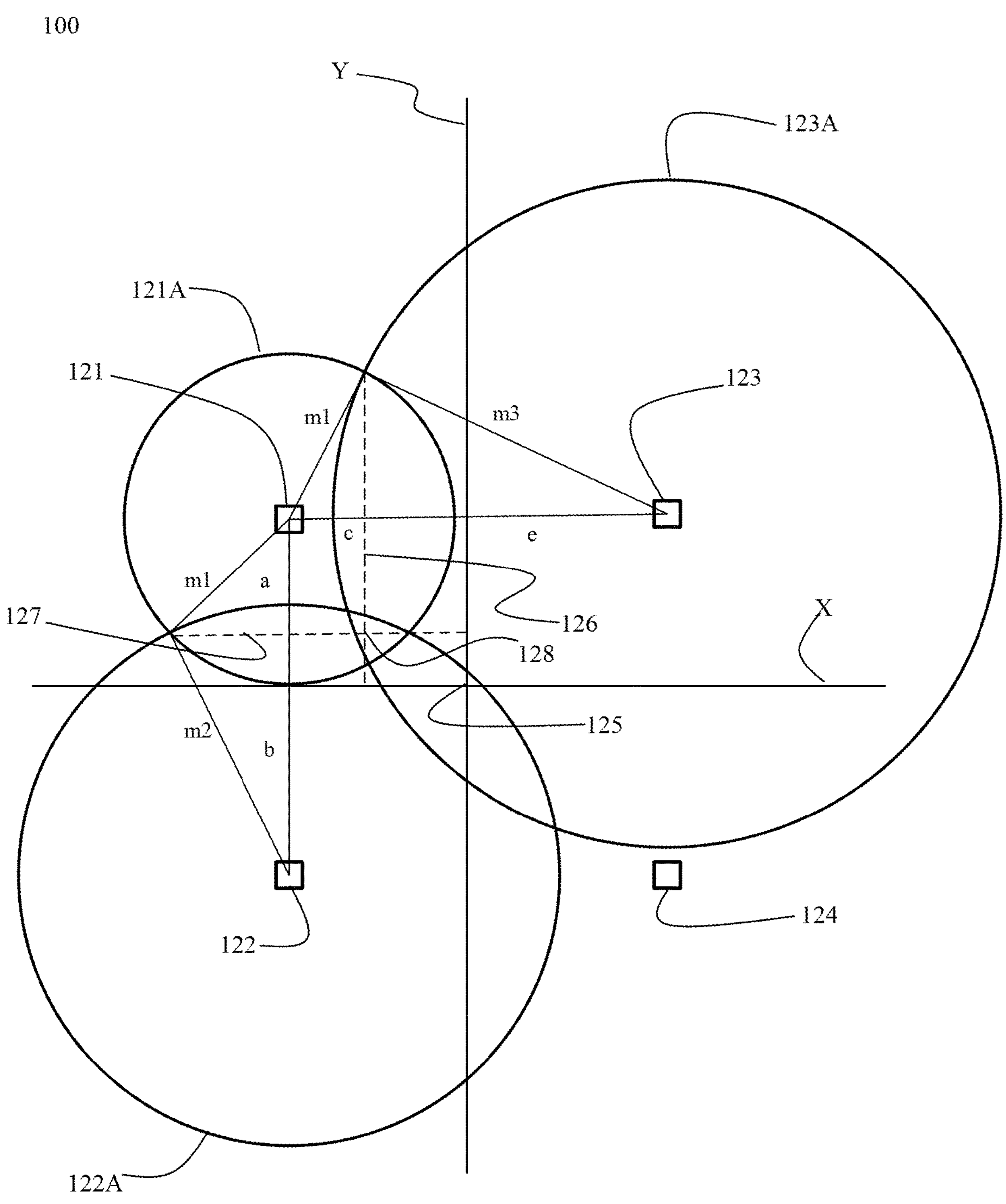
FIG. 4 is an illustrative plot of sensor measurements used to triangulate the position of the wireless power transmitting device relative to a wireless power transfer coil in an electronic device, in accordance with illustrative embodiments of the disclosure.

FIG. 4 is an illustrative plot 100 of sensor detection and measurements used to triangulate the position of the wireless power transmitting device 30 relative to the wireless power transfer coil 25 in electronic device 20. As shown, plot 100 includes an X axis and Y axis. The origin, represented by point 125, is positioned at the center of the wireless power transmission coil 25 in electronic device 20 illustrated in FIG. 1. Plot 100 includes four magnetic sensors that correspond to the magnetic sensors in FIG. 1: sensor 1 (121), sensor 2 (122), sensor 3 (123), and sensor 4 (124). Each sensor makes measurements in three dimensions (i.e., a sphere). In addition, the four magnetic sensors are configured to be in a single sensor plane. Since each of the spheres representing measurements made by the respective sensors is symmetric to the sensor plane, the intersected circle between two spheres is perpendicular to the sensor plane. Therefore, the projected shape of the intersected circle is a simple line.

Information from three sensors is needed to triangulate the position of the wireless power transmitting device 30. In this example, the position of device 30 is determined using sensors 1 (121), 2 (122), and 3 (123). Dashed line 126 represents the X coordinate of device 30 and is the intersection of the sphere 121A, which is the measurement made by sensor 1 (121), and sphere 123A, which is the measurement made by sensor 3 (123). Dashed line 127 represents the Y coordinate of device 30 and is the intersection of the sphere 121A, which is the measurement made by sensor 1

(121), and sphere 122A, which is the measurement made by sensor 2 (122). Accordingly, point 128 (the intersection of lines 126 and 127) represents the location of wireless power transmitting device 30 relative to the wireless power transfer coil 25 in device 20.

FIG. 4 applies to AC field detection embodiments and DC field detection embodiments. In an exemplary AC field detection embodiment, control circuitry in device 20 may measure a level of alternating current voltage induced in each sensor of the plurality of sensors by the alternating current signal transmitted by device 30. The control circuitry may be further configured to use the measured level of alternating current voltage induced in at least a subset of the plurality of sensors to triangulate the position of device 30 relative to the wireless power transfer coil 25 in device 20. In an exemplary DC field detection embodiment, control circuitry in device 20 may use the plurality of magnetic sensors to measure a magnetic field generated by one or more magnets in the wireless power transmitting device 30. The control circuitry may be further configured to use the magnetic field measured by at least a subset of the plurality of magnetic sensors to triangulate the position of device 30 relative to the wireless power transfer coil 25 in device 20.

The X, Y, and Z coordinates of device 30 may be calculated using the equations explained below. In an exemplary operation of a DC field detection embodiment, each sensor is measuring a magnetic field generated by one or more permanent magnets in device 30. In the equations, m1 is the distance from the center of sensor 1 (121) to its measured magnetic field 121A; m2 is the distance from the center of sensor 2 (122) to its measured magnetic field 122A; and m3 is the distance from the center of sensor 3 (123) to its measured magnetic field 123A.

In addition, "a" is the distance from the center of sensor 1 (121) to dashed line 127; "b" is the distance from the center of sensor 2 (122) to dashed line 127; "c" is the distance from the center of sensor 1 (121) to dashed line 126; and "e" is the distance from the center of sensor 3 (123) to dashed line 126. The position of the sensors relative to each other may be known through the design configuration. Accordingly, the distance between sensor 1 (121) and sensor 2 (122) may be configured to be the same as the distance between sensor 1 (121) and sensor 3 (123). Thus, a+b=d; and c+e=d, where "d" is the distance between sensor 1 and sensor 2, which is the same distance between sensor 1 and sensor 3.

The Y coordinate may be calculated using information from sensors 1 (121) and 2 (122) and the following equations:

$$m1^2 - a^2 = m2^2 - b^2$$

$$a + b = d$$

$$a = \frac{m1^2 - m2^2 + d^2}{2d}$$

$$y = \frac{d}{2} \mp \frac{m1^2 - m2^2 + d^2}{2d}$$

In calculating the Y coordinate, if m2 is larger than d, the plus sign (+) should be used. Otherwise, the minus sign (−) should be used.

The X coordinate of device 30 may be calculated using information from sensor 1 (121) and sensor 3 (123) and the following equations:

$$m1^2 - c^2 = m3^2 - e^2$$

$$c + e = d$$

$$c = \frac{m1^2 - m3^2 + d^2}{2d}$$

$$x = \frac{d}{2} \mp \frac{m1^2 - m3^2 + d^2}{2d}$$

In calculating the X coordinate, if m3 is larger than d, the plus sign (+) should be used. Otherwise, the minus sign (−) should be used.

Once the X and Y coordinates are known, the Z coordinate may be calculated using the center position and the distance to any sensor. The following equation calculates the Z coordinate using information for sensor 1:

$$\left(x + \frac{d}{2}\right)^2 + \left(y - \frac{d}{2}\right)^2 + z^2 = m1^2$$

Figure 5C:
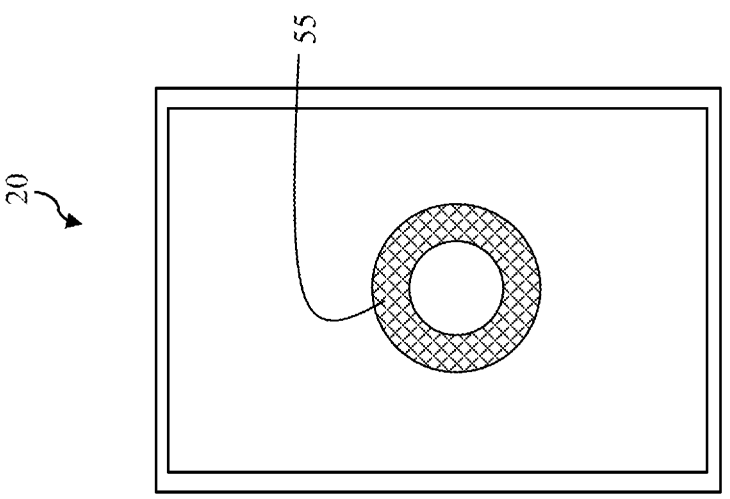
FIGS. 5A, 5B, and 5C are exemplary representations of a user interface on the display of an electronic device providing feedback to users in attaching the wireless power transmitting device to the correct position on the electronic device, in accordance with illustrative embodiments of the disclosure.
Figure 5B:
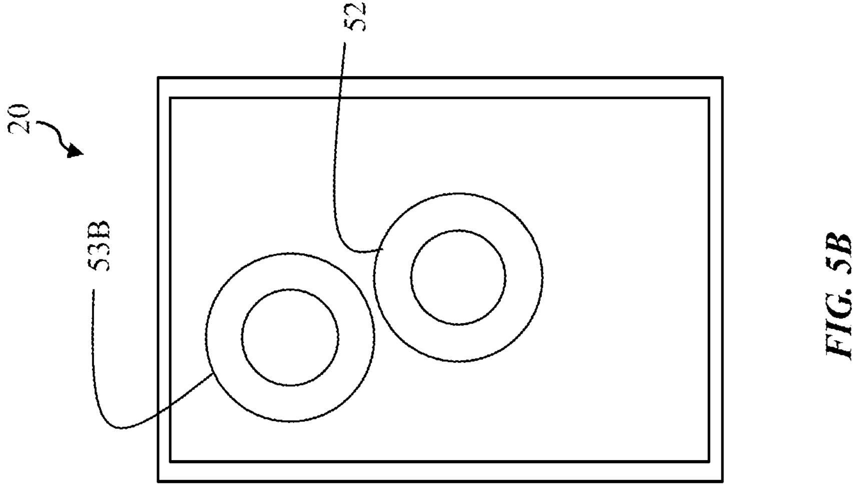
Figure 5A:
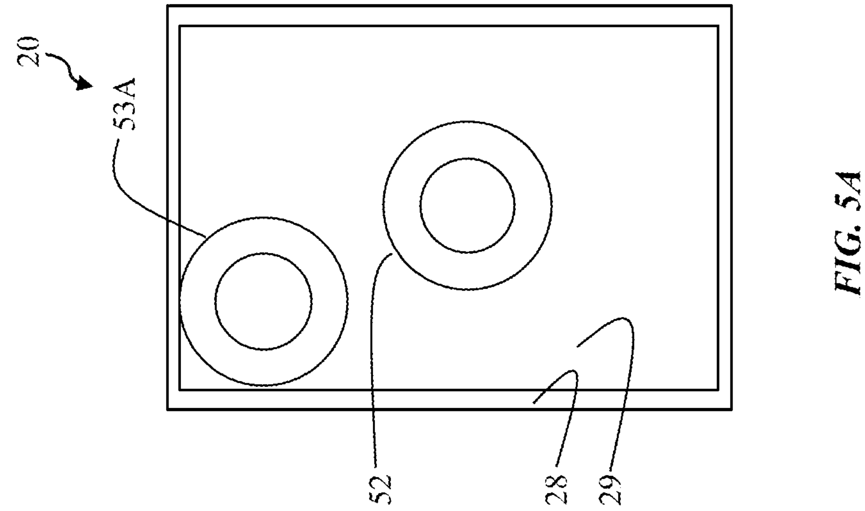

FIGS. 5A, 5B, and 5C are representations of an exemplary user interface as visualized on the display 29 of the electronic device 20 that provides feedback to guide users in attaching the wireless power transmitting device 30 to the correct position on the electronic device 20. FIGS. 5A-5C illustrate the front surface 28 and display 29 of electronic device 20. After control circuitry in device 20 determines a position of device 30 relative to a wireless power transfer coil 25 in device 20 as discussed above, the control circuitry may present visual indications of the position of device 30 relative to coil 25 using the display 29. In the illustrated example, ring 52 is a visual representation for the position of the wireless power transfer coil 25 and rings 53A, 53B are visual representations for the position of device 30. As best seen in FIGS. 5A and 5B, when a user moves device 30 relative to coil 25, the control circuitry in device 20 updates display 29 with the new position of device 30. In the figures, a user is moving device 30 from a position in the upper left corner of device 20 (illustrated as 53A in FIG. 5A) diagonally downward to a position that is closer to coil 25 (illustrated as 53A in FIG. 5A). Ring 52 has a static position, because the wireless power transfer coil 25 does not move. When device 30 is positioned within a particular tolerance range of coil 25, control circuitry in device 20 may update the display to indicate that device 30 is correctly positioned relative to device 20. For example, as shown in FIG. 5C, the control circuitry may display a single shape 55. In another example, the control circuitry may change the color of the visual indication 55 and/or the brightness of the displayed visual indication 55. In another example, the control circuitry may cause device 20 to produce a sound. In another example, control circuitry in device 20 may present a symbol and/or text on display 29.

As explained above with reference to FIGS. 2 and 3, the wireless power transmitting device 30 includes a housing 36 and a charging surface 32 in the geometric shapes of a cylinder and a circle, respectively. Device 30 housing 36 and charging surface 32 are not limited to the exemplary geometric shapes in FIGS. 2 and 3 and may be configured to have various geometric shapes without departing from the scope and spirit of the invention as described herein. Accordingly, when the control circuitry of device 20 presents visual indications of the position of the wireless power transmitting device 30 using the display, the control circuitry may present a visual representation of the geometric shape of housing 36 and/or charging surface 32. In another embodiment, the size of the visual representation of the geometric shape on display 29 may be the same size as housing 36 and/or charging surface 32.

Figure 6:
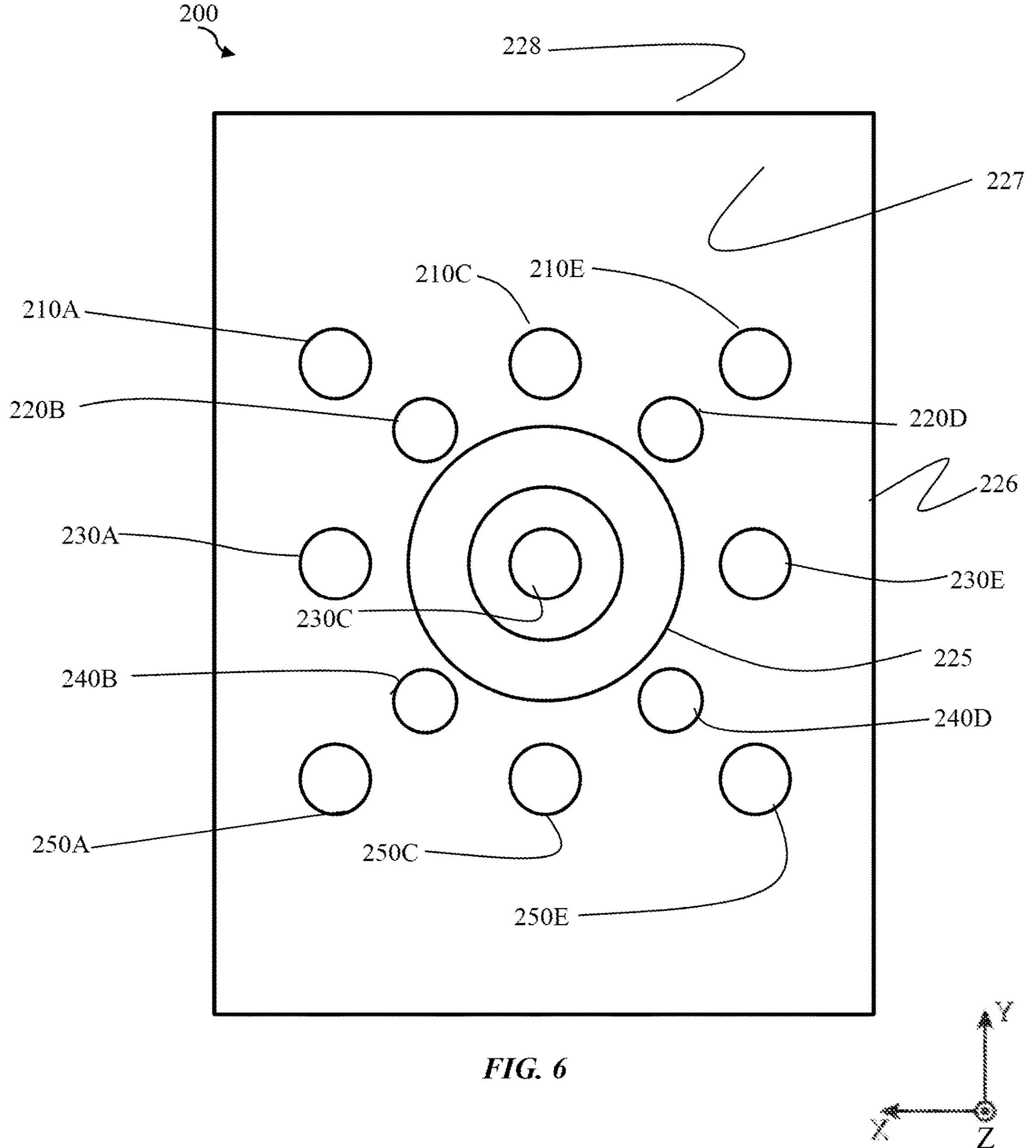
FIG. 6 is a rear perspective view of another exemplary wireless power receiving device according to an aspect of the disclosure, in accordance with illustrative embodiments of the disclosure.

FIG. 6 is a rear perspective view of an alternative exemplary electronic device 200 according to an aspect of the disclosure. Device 200 has many similar elements as electronic device 20. Where appropriate, like numbers have been used for analogous features of device 200 and device 20. As shown in FIG. 6, electronic device 200 includes a housing such as housing 226. Housing 226 has a surface 227, also referred to herein as rear surface 227, that is placed on or over a charging surface of device 30 for wirelessly charging device 200. For example, both rear surface 227 and the charging surface 32 of device 30 may lie substantially parallel to the X-Y plane of FIG. 6 during wireless charging. Housing 226 has a front surface 228 that is substantially defined by a display screen (e.g., OLED display) 229, the front surface 229 is opposite the rear surface 227.

Electronic device 200 includes one or more wireless power transfer coils 225 on or within housing 226. Housing 226 may include metal materials, dielectric materials, or combinations of these and/or other materials. In scenarios where coil(s) 225 is mounted within housing 226, housing 226 may include dielectric portions in the vicinity of the coils to allow external magnetic fields to interact with coil(s) 225.

As shown in FIG. 6, the electronic device 200 also includes a plurality of magnetic sensors arranged in a sensor array. In an exemplary embodiment, the plurality of magnetic sensors in the sensor array may be arranged in a row and column structure. The exemplary embodiment illustrated in FIG. 6 includes an array with five rows (210, 220, 230, 240, and 250) and five columns (A, B, C, D and E). As shown, the plurality of magnetic sensors in the array may also be positioned such that the number of magnetic sensors in each row and/or column alternates. The example in FIG. 6 includes 13 magnetic sensors, wherein the magnetic sensors are positioned in alternating rows and columns—rows 210, 230, and 250 each include three magnetic sensors; rows 220 and 240 each include two magnetic sensors; columns A, C, and E each include three magnetic sensors; and columns B and D each include two magnetic sensors. The number and position of magnetic sensors in the sensor array of device 200 is not limited to the illustrated embodiment in FIG. 6. For example, device 200 may have more or fewer magnetic sensors and may be arranged in an array with a different configuration. The magnetic sensors in the sensor array may be a coil or other magnetic sensor such as a tunnel-magnetoresistance (TMR) sensor, a giant-magnetoresistance (GMR) sensor, or a Hall effect sensor, or any combination thereof. In an embodiment of the present disclosure, the plurality of magnetic sensors includes the wireless power transfer coil 225.

Electronic device 200 may be used in alternative alternating current (AC) field-based detection embodiments and/or direct-current (DC) field-based detection embodiments to assist a user in attaching the wireless power transmitting device 30 to the correct position on electronic device 200. As stated above, the higher number of sensors may lead generally to higher detection fidelity.

In AC field detection embodiment, the coil 35 in wireless power transmitting device 30 generates and transmits an alternating current (AC) magnetic field signal (e.g., a "ping") periodically. The transmitted alternating current signal may be a low-power signal relative to the AC signals produced and transmitted during wireless power delivery operations. The wireless power transmitting device 30 may transmit the alternating current signal at a repeating interval. For example, device 30 may transmit the AC signal every 0.1 second. Alternatively, device 30 may transmit the AC signal at an interval greater than 0.1 seconds or less than 0.1 seconds. In addition, the alternating current signal may have a pattern, which may be predetermined and known to electronic device 200, that enables control circuitry in electronic device 200 to identify the alternating current signal pattern relates to a particular type of wireless power transmitting device 30.

The alternating current signal transmitted by device 30 may induce alternating current voltage in the plurality of sensors in the sensor array in electronic device 200. Control circuitry in device 200 may be configured to measure a level of alternating current voltage induced in each magnetic sensor of the sensor array. Based on the level of induced voltage, the control circuitry in device 200 may be configured to determine a position of device 30 relative to the wireless power transfer coil 225 in electronic device 200.

In an exemplary embodiment, the control circuitry in device 200 may be configured to use the level of alternating current voltage induced in each magnetic sensor of the sensor array to calculate a distance from the wireless power transmitting device 30 to each sensor. Knowing the distance from device 30 to each sensor of the sensor array, the control circuitry may triangulate the position of device 30 relative to the wireless power transfer coil 225 in electronic device 200, as explained in detail above with reference to FIG. 4.

In an another embodiment, the control circuitry in device 200 may be configured to compare the measured level of alternating current voltage induced in each magnetic sensor of the sensor array with values in a lookup table to determine the position of device 30 relative to the wireless power transfer coil 225 electronic device 200. The lookup table based on a sensor array may be created in a calibration phase in the same manner as explained above with reference to the plurality of sensors 21, 22, 23, 24 in device 20. As explained above, the lookup table may also include measurements for different orientations of device 30 to enable control circuitry in device 200 to determine a position and orientation of device 30 relative to the wireless power transfer coil 225 using measurements from the plurality of sensors in the sensor array. At run-time, control circuitry of device 200 may use numerical optimization methods, such as Gradient Descent, Nelder-Mead, and Differential Evolution, to determine a position of device 30 relative to coil 225 that minimizes the difference between the measured alternating current voltage values and the values in the lookup table for the plurality of magnetic sensor locations in the sensor array.

In an alternative DC field-based detection embodiment, the wireless power transmitting device 30 may include one or more magnets. The one or more magnets in device 30 may comprise a permanent magnet. In addition the one or more magnets may be disposed circumferentially around a wireless power transfer coil 35 in device 30. The one or more magnets in device 30 may generate a magnetic field. Alternatively, the one or more magnets in device 30 may generate a particular magnetic field pattern.

Similar in function to device 20 explained above, control circuitry in device 200, using the plurality of sensors in a sensor array, may detect a magnetic field generated by one or more magnets in the wireless power transmitting device and determine a position of the wireless power transmitting device 30 relative to the wireless power transfer coil 225 in device 200. In another embodiment, control circuitry in device 200 may be configured to detect the particular magnetic field pattern generated by the one or more magnets in device 30 using the plurality of magnetic sensors in the sensor array and determine a position of the device 30 relative to the coil 225. By detecting the particular magnetic field pattern, control circuitry in device 200 may be able to determine that the particular magnetic field pattern relates to a particular wireless power transmitting device 30 (i.e., a particular type of wireless charger), which may allow the control circuitry to reject any unwanted magnetic interferences from other devices.

Once the magnetic field or particular magnetic field pattern has been detected, control circuitry in device 200 may be configured to determine a position of the wireless power transmitting device 30 relative to the wireless power transfer coil 225 in device 200. In an exemplary embodiment, control circuitry in device 200 may measure the magnetic field using the plurality of sensors of the sensor array and determine a distance from device 30 to each magnetic sensor of in the sensor array based on the magnetic field measured in each magnetic sensor. Control circuitry in device 200 may then determine the position of the wireless power transmitting device 30 relative to the wireless power transfer coil 225 by triangulating the distance from device 30 to the plurality of magnetic sensors in the sensor array, as explained in detail above with reference to FIG. 4.

In an alternative embodiment, the control circuitry in device 200 may be configured to measure the magnetic field using the plurality of magnetic sensors in the sensor array and to compare a magnetic field measurement from each magnetic sensor in the sensor array with values in a lookup table to determine the position of device 30 relative to the wireless power transfer coil 225 electronic device 200. The lookup table based on a sensor array may be created during a calibration phase in the same manner as explained above with reference to the plurality of sensors 21, 22, 23, 24 in device 20. As explained above, the lookup table may also include measurements for different orientations of device 30 to enable control circuitry in device 200 to determine a position and orientation of device 30 relative to the wireless power transfer coil 225 using measurements from the plurality of sensors in the sensor array. At run-time, control circuitry of device 200 may use numerical optimization methods, such as Gradient Descent, Nelder-Mead, and Differential Evolution, to determine a position of device 30 relative to coil 225 that minimizes the difference between the magnetic field measured at each of the plurality of magnetic sensor locations in the sensor array and the values in the lookup table.

The foregoing description is provided for the purpose of explanation and is not to be construed as limiting the invention. While the invention has been described with reference to illustrative examples or methods, it is understood that the words which have been used herein are words of description and illustration, rather than words of limitation. Furthermore, although the invention has been described herein with reference to particular structure, methods, and examples, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed:

1. An electronic device configured to receive wireless power from a wireless power transmitting device, the electronic device comprising:
- a wireless power transfer coil;
- a plurality of magnetic sensors, the plurality of magnetic sensors including a direct current (DC) sensor and an alternating current (AC) sensor;
- a display; and
- control circuitry configured to:
  - detect, using the DC sensor, a magnetic field from the wireless power transmitting device;
  - activate the AC sensor to search for an alternating current signal transmitted by the wireless power transmitting device;
  - detect, using one or more of the plurality of magnetic sensors, the alternating current signal transmitted by the wireless power transmitting device;
  - determine a position of the wireless power transmitting device relative to the wireless power transfer coil; and
  - present, using the display, visual indications of the position of the wireless power transmitting device relative to the wireless power transfer coil.

2. The electronic device of claim 1, wherein the plurality of magnetic sensors includes the wireless power transfer coil.

3. The electronic device of claim 1, wherein the control circuitry detects a change in a magnetic field using at least one magnetic sensor of the plurality of magnetic sensors.

4. The electronic device of claim 1, wherein the control circuitry measures a level of alternating current voltage induced in the plurality of magnetic sensors by the alternating current signal transmitted by the wireless power transmitting device.

5. The electronic device of claim 4, wherein the control circuitry determines a distance from the wireless power transmitting device to each magnetic sensor of the plurality of magnetic sensors based on the measured level of alternating current voltage induced in each magnetic sensor.

6. The electronic device of claim 5, wherein the control circuitry determines the position of the wireless power transmitting device relative to the wireless power transfer coil by triangulating the distance from the wireless power transmitting device to at least three magnetic sensors of the plurality of magnetic sensors.

7. The electronic device of claim 4, wherein the control circuitry determines the position of the wireless power transmitting device relative to the wireless power transfer coil by comparing the measured level of alternating current voltage induced in each magnetic sensor of the plurality of magnetic sensors with values in a lookup table.

8. The electronic device of claim 1, wherein the wireless power transmitting device transmits the alternating current signal at a repeating interval.

9. The electronic device of claim 1, wherein the alternating current signal has a pattern, and wherein detecting, using the plurality of magnetic sensors, the alternating current signal transmitted by the wireless power transmitting device comprises detecting the pattern.

10. The electronic device of claim 1, wherein the wireless power transmitting device includes a housing surface having a geometric shape, and wherein presenting, using the display, the visual indications of the position of the wireless power transmitting device relative to the wireless power transfer coil comprises presenting a visual representation of the geometric shape.

11. The electronic device of claim 10, wherein the size of the housing surface and the size of the visual representation of the geometric shape are the same.

12. An electronic device configured to receive wireless power from a wireless power transmitting device, the electronic device comprising:

a wireless power transfer coil;

a plurality of magnetic sensors;

a display; and control circuitry configured to:

detect, using the plurality of magnetic sensors, a magnetic field generated by one or more magnets in the wireless power transmitting device, wherein the one or more magnets in the wireless power transmitting device has a particular magnetic field pattern, and wherein detecting, using the plurality of magnetic sensors, the magnetic field generated by the one or more magnets in the wireless power transmitting device comprises determining whether the detected magnetic field includes the particular magnetic field pattern;

determine a position of the wireless power transmitting device relative to the wireless power transfer coil; and present, using the display, visual indications of the position of the wireless power transmitting device relative to the wireless power transfer coil.

13. The electronic device of claim 12, wherein the plurality of magnetic sensors includes the wireless power transfer coil.

14. The electronic device of claim 12, wherein the control circuitry:

measures, using the plurality of magnetic sensors, the magnetic field; and determines a distance from the wireless power transmitting device to each magnetic sensor of the plurality of magnetic sensors based on the magnetic field measured in each magnetic sensor.

15. The electronic device of claim 14, wherein the control circuitry determines the position of the wireless power transmitting device relative to the wireless power transfer coil by triangulating the distance from the wireless power transmitting device to at least three magnetic sensors of the plurality of magnetic sensors.

16. The electronic device of claim 12, wherein the control circuitry determines the position of the wireless power transmitting device relative to the wireless power transfer coil by:

measuring the magnetic field using the plurality of magnetic sensors; and comparing a magnetic field measurement from each magnetic sensor of the plurality of magnetic sensors with values in a lookup table.

17. The electronic device of claim 12, wherein the one or more magnets in the wireless power transmitting device are permanent magnets.

18. The electronic device of claim 12, wherein the wireless power transmitting device further comprises a wireless power transfer coil and the one or more magnets in the wireless power transmitting device are disposed circumferentially around the wireless power transfer coil.

19. The electronic device of claim 12, wherein the wireless power transmitting device includes a housing surface having a geometric shape, and wherein presenting, using the display, the visual indications of the position of the wireless power transmitting device relative to the wireless power transfer coil comprises presenting a visual representation of the geometric shape.

20. The electronic device of claim 19, wherein the size of the housing surface and the size of the visual representation of the geometric shape are the same.

21. The electronic device of claim 12, wherein the plurality of magnetic sensors are arranged in an array.

22. The electronic device of claim 21, wherein the plurality of magnetic sensors in the array are arranged in a row and column structure.

* * * * *